(12) United States Patent
Vendrow et al.

(10) Patent No.: US 8,600,363 B2
(45) Date of Patent: Dec. 3, 2013

(54) SYNCHRONIZATION IN UNIFIED MESSAGING SYSTEMS

(75) Inventors: Vlad Vendrow, Redwood Shores, CA (US); Vlad Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 898 days.

(21) Appl. No.: 12/726,332

(22) Filed: Mar. 17, 2010

(65) Prior Publication Data

US 2010/0185584 A1    Jul. 22, 2010

Related U.S. Application Data

(63) Continuation of application No. 11/219,532, filed on Sep. 2, 2005, now Pat. No. 7,702,669.

(60) Provisional application No. 60/607,220, filed on Sep. 2, 2004.

(51) Int. Cl.
*H04W 88/02*       (2009.01)

(52) U.S. Cl.
USPC ........................................................ 455/416

(58) Field of Classification Search
USPC ............... 455/457, 416, 414.1; 709/206, 250; 707/270.1, 620, 206, 218; 358/1.15; 726/9; 340/539.26, 12.55; 379/93, 24, 379/88.13, 100.08
See application file for complete search history.

(56) References Cited

U.S. PATENT DOCUMENTS

| | | | |
|---|---|---|---|
| 5,530,740 A | 6/1996 | Irribarreb et al. | |
| 5,717,742 A | 2/1998 | Hyde-Thomson | |
| 5,948,059 A | 9/1999 | Woo et al. | |
| 6,643,669 B1 | 11/2003 | Novak et al. | |
| 6,792,085 B1 | 9/2004 | Rigaldies et al. | |
| 6,983,308 B1 | 1/2006 | Oberhaus et al. | |
| 6,987,840 B1 | 1/2006 | Bosik et al. | |
| 6,993,561 B2 | 1/2006 | Lincke et al. | |
| 6,999,469 B1 | 2/2006 | Chu et al. | |
| 7,024,457 B1 | 4/2006 | Newman et al. | |
| 7,024,474 B2 | 4/2006 | Clubb et al. | |
| 7,047,525 B2 | 5/2006 | Prunity et al. | |
| 7,076,558 B1 | 7/2006 | Dunn | |
| 7,185,058 B2 | 2/2007 | Blackwell et al. | |
| 7,702,669 B2 * | 4/2010 | Vendrow et al. | 707/620 |
| 8,285,267 B2 * | 10/2012 | Vendrow et al. | 455/416 |
| 8,335,498 B2 * | 12/2012 | Vendrow et al. | 455/416 |
| 2002/0120697 A1 | 8/2002 | Generous et al. | |
| 2005/0262436 A1 | 11/2005 | Deen et al. | |

OTHER PUBLICATIONS

Closing of Reexamination dated received in U.S. Appl. No. 95/001,844 dated Jan. 10, 2013 (157 pages).

(Continued)

*Primary Examiner* — Diane Mizrahi
(74) *Attorney, Agent, or Firm* — Hickman Palermo Truong Becker Bingham Wong LLP

(57) ABSTRACT

A unified messaging system, method, apparatus, individual components and the like are disclosed. The unified messaging system comprises a server, a client and a synchronization application for synchronizing voicemail messages and fax messages on both the server and the client is disclosed. The server messages may include received messages and sent messages, each of which is indexed according to their respective indices and read/unread statuses. Similarly, the client messages may include received messages and sent messages, each of which is indexed according to their respective indices and read/unread statuses.

30 Claims, 5 Drawing Sheets

(56) References Cited

OTHER PUBLICATIONS

Request for Inter Partes Reexamination of U.S. Patent No. 7,02,669 Pursuant to 35 U.S.C. 311-318 and CFR 1.902 et seq. Dated Dec. 8, 2011, 269 pages.
Order Granting Request for Inter Parties Examination and Office Action received in 95/001,844 dated Jan. 25, 2012 (53 pages).
Requestor Comments received in 95/001,844 dated Apr. 12, 2012 (51 pages).
R. Braden, "Requirements for Internet Hosts—Communication Layers", Internet Engineering Task Force, Dated Oct. 1989, 116 pages.
Myers J. et al., "Post Office Protocol—Version 3", Network Working Group Request for Comments: 1939, dated May 1996, 23 pages.
Crispin M., Internet Message Access Protocol—Version 4rev1, Network Working Group, dated Dec. 1996, 82 pages.
Fielding R. et al., "Hypertext Transfer Protocol—HTTP/1.1", Network Working Group, Request for Comments: 2616, dated Jun. 1999, 176 pages.
Postel, Jonathan B., "Simple Mall Transfer Protocol", Information Sciences Institute, University of Southern California, dated Aug. 1982, 72 pages.
Crocker, David, H., "Standard for the Format of ARPA Internet Text Message", Dept. of Electrical Engineering, dated, Aug. 13, 1982, 50 pages.
Boyce, J., "Microsoft Office Outlook 2003 Inside Out," Nov. 19, 2003, Microsoft Press, Redmond, Washington (14 pages).
Office Action received in U.S. Appl. No. 13/277,950 dated Jan. 4, 2012 (25 pages).
Applicant Initialed Interview Summary received in U.S. Appl. No. 13/277,950 dated Jan. 13, 2012 (3 pages).
Notice of Publication of Application received in U.S. Appl. No. 13/277,950 published Feb. 16, 2012 (1 page).
Restriction Requirement received in U.S. Appl. No. 13/281,213 dated Feb. 15, 2012 (8 pages).
Notice of Publication of Application received in U.S. Appl. No. 13/281,213 published Feb. 16, 2012 (1 page).
Notice of appeal by Patent Owner in inter Partes Reexamination, Reexamination Control No. 95/001,844, dated May 3, 2013, 2 pages.
Action Closing Prosecution received in 95/001,844 dated May 3, 2012 (140 pages).
Preliminary Amendment and Response to Restriction Requirement filed Jun. 8, 2012 (14 pages).
Inter Partes Reexamination No. 95/001,844, "Response to Office Action in Inter Partes Reexamination", dated Jul. 3, 2012, 55 pages.
Inter Partes Reexamination No. 95/001,844, Patent Owner's Petition Under 37 C.F.R 1.181, dated Jul. 3, 2012, 4 pages.
Requesters Response, Control No. 95/001,844, "Comments by Third Party Requester", dated, Dated Aug. 2, 2012, 55 pages.
NTER Partes Reexamination No. 95/001,844, Requesters Response to Patent Owner's Petition Under 37 C.F.R 1.81, dated Aug. 2, 2012, 7 pages.
Inter Partes Reexamination No. 95/001,844, "Amendment", dated Mar. 13, 2012, 57 pages.
Appeal Brief filed in inter Partes Reexamination, Reexamination Control No. 95/001,844 on Jul. 3, 2013 (65 pages).
Supplemental Reply filed in 95/001,844 dated Oct. 25, 2012 (5 pages).

* cited by examiner

SYNCHRONIZATION IN UNIFIED MESSAGING SYSTEMS

CROSS-REFERENCE TO RELATED APPLICATIONS

This application is a continuation (and claims the benefit of priority under 35 USC 120) of U.S. application Ser. No. 11/219,532, filed Sep. 2, 2005, now U.S. Pat. No. 7,702,669 which is a nonprovisional application of and claims priority to U.S. Application Ser. No. 60/607,220, filed on Sep. 2, 2004.

BACKGROUND

The present application relates generally to messaging systems.

A messaging system can be used to convey information from a sender to a recipient. Conventional messaging systems use various input and delivery mechanisms including telephones, pagers, computers, recorders, answering machines and other systems to formulate and deliver the message content.

SUMMARY OF THE INVENTION

According to one aspect, a unified messaging system includes a server configured to store a plurality of server messages, a client configured to store a plurality of client messages and a synchronization application which synchronizes the client messages with the server messages associated with the client. The server messages includes voicemail messages and fax messages for a client, and the client messages includes voicemail messages and fax messages for the client and correspond generally to the server messages.

In some implementations, one or more of the following features may be present. The server messages include received messages and sent messages, and the client messages include received messages and sent messages. Each of the server messages includes a server message index and a read/unread status, each of the client messages includes a client message index and a read/unread status, and synchronizing the client messages with the server messages includes synchronizing server message indices with client message indices, and server message read/unread statuses with client message read/unread statuses In another implementation, the synchronization application determines whether a server message on the server has previously been synchronized to establish a corresponding client message on the client.

According to another aspect, a synchronization method includes storing a plurality of server messages containing voicemail messages and fax messages on a server, storing a plurality of client messages containing voicemail messages and fax messages corresponding generally to the server messages on a client, and synchronizing the client messages with the server messages.

In a related aspect, a synchronization method includes storing a plurality of server messages containing voicemail messages and fax messages on a server, storing a plurality of client messages containing voicemail messages and fax messages corresponding generally to the server messages on a client, and generating an identifier on the client and the server at each synchronization.

In various implementations, one or more of the following advantages may be present. Based on the results of the discrepancy assessment established during the synchronization, the synchronization application creates a list of synchronization actions that can be performed in order to synchronize the messages on the server with the messages on the client without having a need to maintain a history of all prior messages on the client. The state of messages on the client may also be updated so that requests may be sent to the server to update the state of messages on the server.

Other features and advantages will be readily apparent from the following detailed description, the accompanying drawings and the claims.

BRIEF DESCRIPTION OF THE DRAWINGS

Like reference numbers and designations in the various drawings indicate like elements.

DETAILED DESCRIPTION

Figure 1:
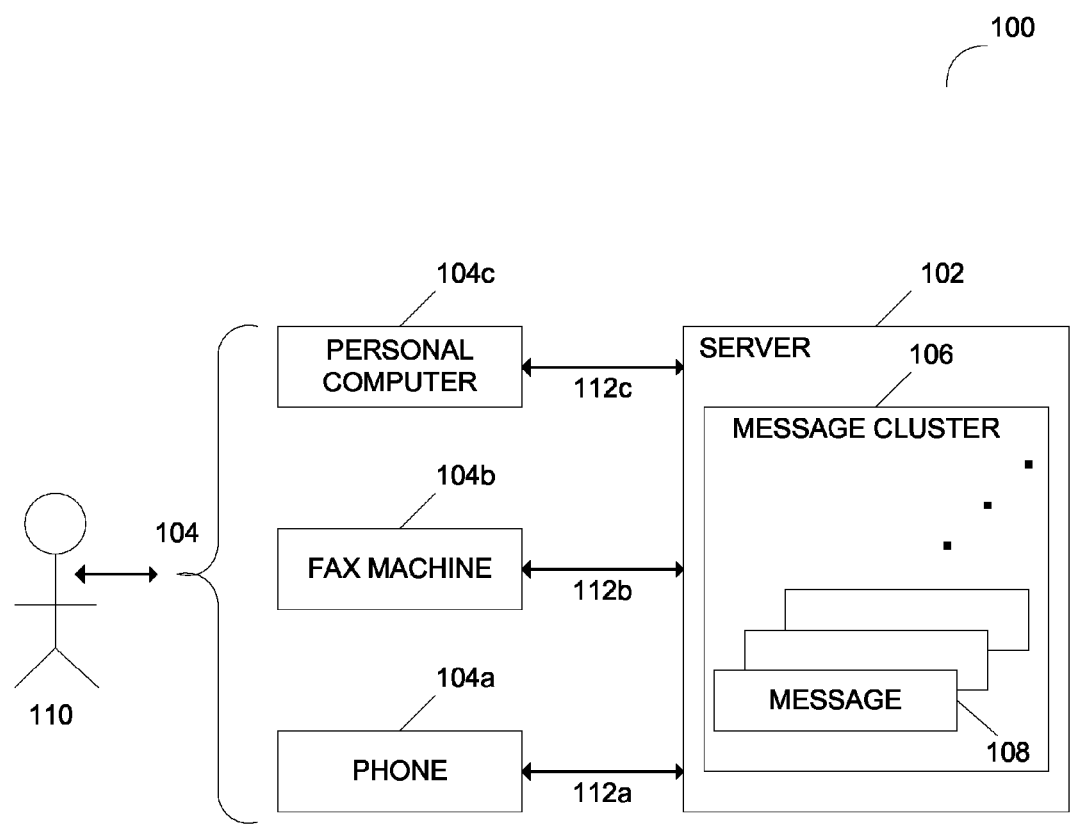
FIG. 1 is a block diagram of a unified messaging system according to one implementation.

As shown in FIG. 1, a unified messaging system 100 integrates several different communications media to allow a user 110 to send and retrieve voice 112a, fax 112b, and messages 112c (e.g., e-mail, text, etc.) from a single interface, whether it be a phone 104a, a fax machine 104b, or a personal computer 104c.

A unified messaging system 100 includes a server 102 that can store messages 108 of different types and of different communications media (e.g., received messages, sent messages, voicemail messages, fax messages, etc.). Messages 108 are grouped into message clusters 106, or mailboxes, that are associated with individual users 110, or groups of users. In one implementation, each individual message 108 includes, but is not limited to, a unique message index (e.g. identifiers), message content (e.g., voice, video, data), message properties (e.g., date and time, sender information), and message status (e.g., read, unread). A particular combination of message indexes and message statuses of all messages 108 in a given message cluster 106 is referred to as the state of the messages in the given cluster 106.

The unified message system 100 further includes one or more clients 104 for a given user 110. A client 104 can store local copies of the messages 108 that are stored on the server 102. A client 104 can include a synchronization application (discussed in greater detail below) that periodically synchronizes the client 104 with the server 102 to ensure that the state of messages on the server 102 is the same as the state of messages on the client 104. Discrepancies between the state of messages on the server 102 and the state of messages on the client 104 arise as a result of the user 110 deleting a message (e.g., on the server 102 and not deleting the message on the client 104, and visa versa), messages arriving at the server 102 and not being loaded on the client 104, the user 110 viewing a message on a client device or at the server 102, and so on. In one implementation, the synchronization application is not an e-mail application.

Figure 2A:
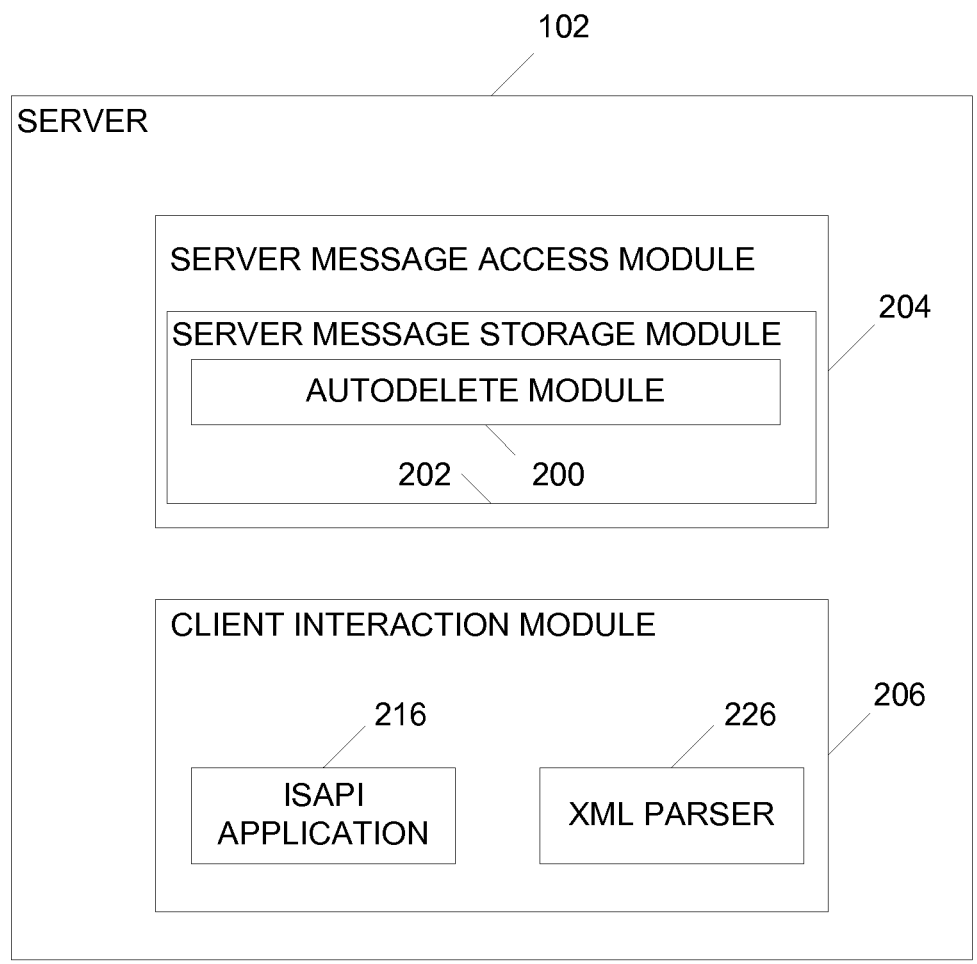
FIG. 2A is a block diagram of a server.

FIG. 2A illustrates components of a server 102 according to one implementation. The server 102 includes a server message storage module 202, which manages the storage of messages on the server 102. The server message storage module 202 can be an actual location where the messages are stored. Alternatively, the server message storage module 202 can contain information as to where and how the messages are stored on the server 102 or an external server.

The server 102 further includes an autodelete module 200, which automatically deletes certain messages 108 from the server 102 at predetermined intervals. For instance, the server 102 can be configured such that a given message 108 that arrives at the server 102 is automatically deleted from the server ten days after arriving. The autodelete module 202 can be a part of the server message storage module 202.

The server 102 further includes a server message access module 204, which is an interface to the server message storage module 202. The content and the properties of a given message in the server message storage module 202 are accessed and manipulated through the server message access module 204. The server message storage module 202 can be a part of the server message access module 204.

The server 102 further includes a client interaction module 206 through which the server 102 interacts with a client 104. In particular, the server 102 uses the client interaction module 206 to receive and process requests from a client 104. In one implementation, the client interaction module 206 includes an Internet Server Application Program Interface (ISAPI) application 216 for receiving the requests and an XML parser 226 for processing the requests. The client interaction module 206 can also include a telephone access interface (not shown), e.g., HTTP stream interface, and a web access (not shown), e.g., IVR interface.

Figure 2B:
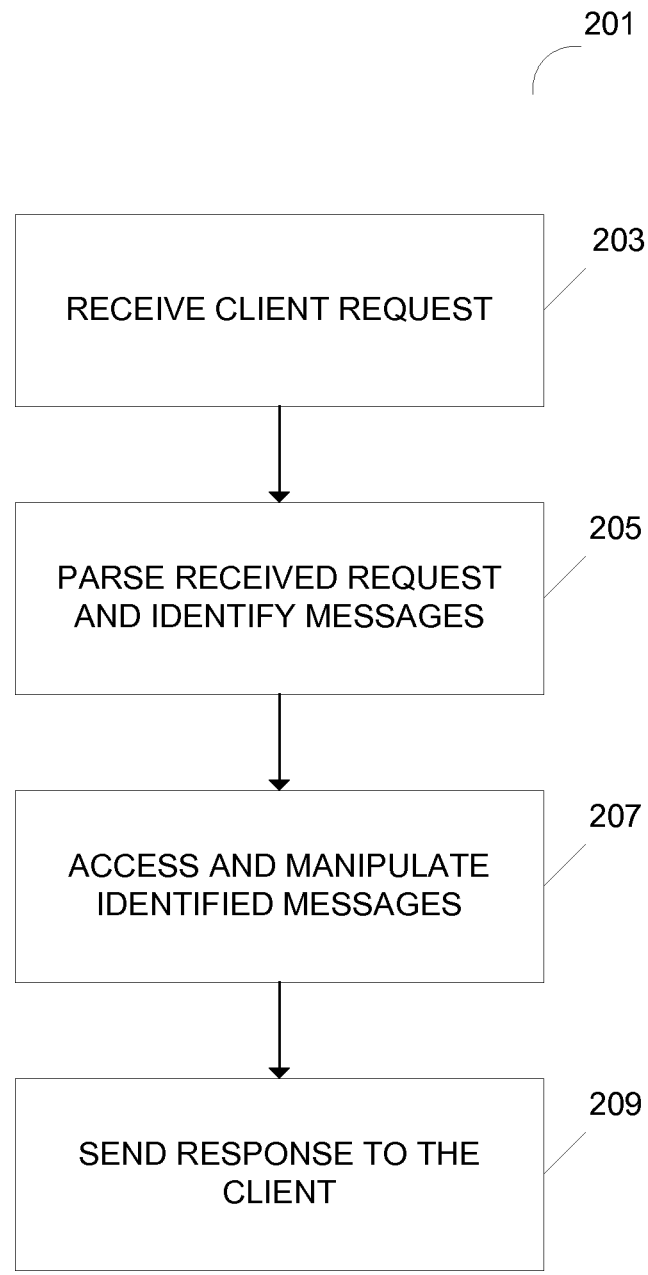
FIG. 2B is a flowchart illustrating a sequence of steps for processing a client request on a server.

Accordingly, as shown in a flow chart in FIG. 2B, the steps 201 for processing a request from a client 104 on the server 102 include receiving the request through, for example, the ISAPI application 216 (step 203). Processing the client's request further includes parsing the request using, for example, the XML parser 226 (step 205), which identifies the messages in the server message storage module 202 that need to be accessed. Processing the client's request further includes accessing the identified messages through the server message access module 204 and manipulating the identified messages in the server message storage module 202 per the client's request (207). Optimally, processing the client's request further can include sending a response to the client 104 (step 209). For instance, the response can include information requested by the client 104 and/or information as to whether the request was processed successfully or if there were errors.

Figure 3A:
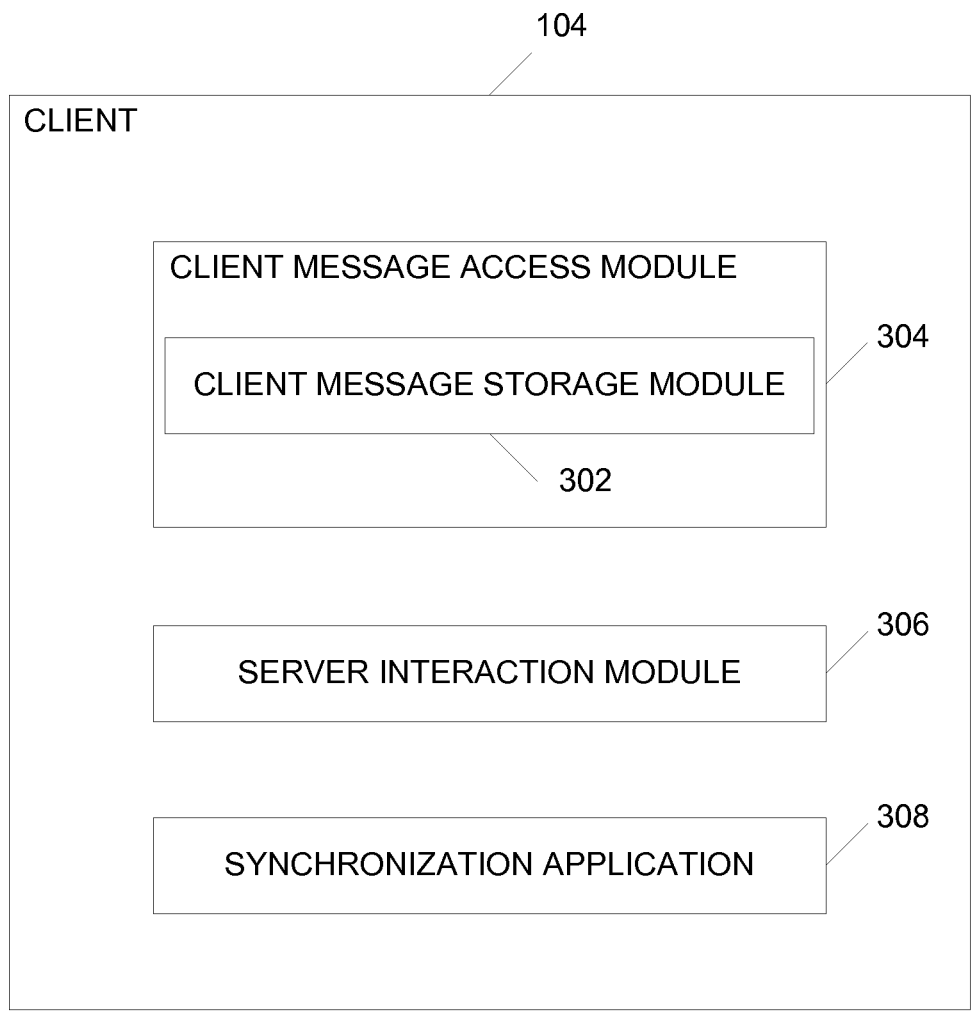
FIG. 3A is a block diagram of a client.

FIG. 3A illustrates components of a client 104 according to one implementation. The client 104 includes a client message storage module 302, which manages the storage of messages on the client 104. The client message storage module 302 can be an actual location where the messages are stored. Alternatively, the client message storage module 302 can contain information as to where and how the messages are stored on the client 104 or an external device.

The client 104 further includes a client message access module 304, which is an interface to the client message storage module 302. The content and the properties of a given message in the client message storage module 302 are accessed and manipulated through the client message access module 304. The client message storage module 302 can be part of the client message access module 304.

The client 104 further includes a server interaction module 306 through which the client 104 interacts with the server 102. In particular, the client 104 sends requests to the server 102 and receives the server's responses through the server interaction module 306. To send a request to the server 102, the client 104 first uses the server interaction module 306 to connect to the server 102 by establishing, for example, an HTTP connection. Subsequently, the server interaction module 306 exchanges data with the server 102 specific to the request using, for example, an XML parser.

The client 104 further includes a synchronization application 308, which is responsible for synchronizing the messages on the server 102 with the messages on the client 104. In particular, the synchronization application 104 receives the state of messages in the server message storage module 202 on the server 102 and compares it with the state of the messages in the client message storage module 302 on the client 104. The synchronization application 308 further identifies a set of actions that need to be performed to synchronize the messages on the server 102 with the messages on the client 104 and subsequently performs those actions.

Figure 3B:
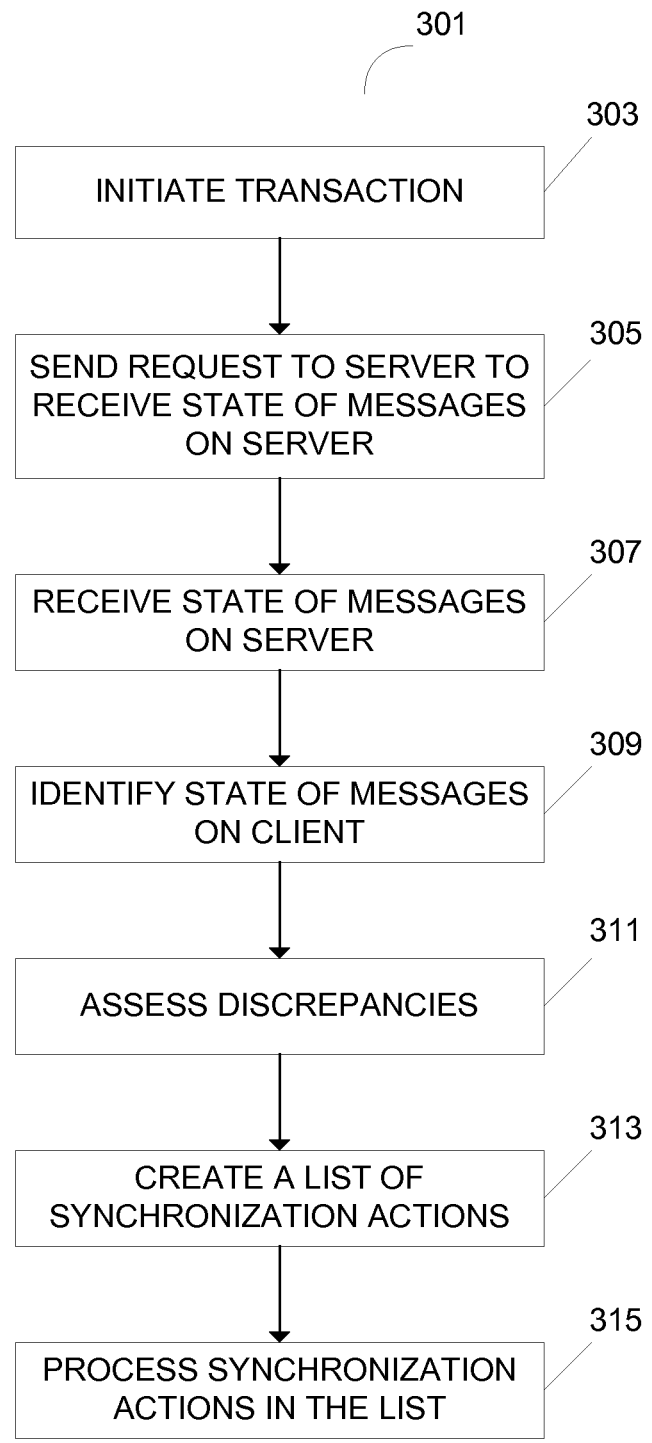
FIG. 3B is a flowchart illustrating a client-based synchronization process.

A process 301 that the synchronization application 308 uses to synchronize the messages on the server 102 with the messages on the client 104, according to one implementation, is outlined in more detail in FIG. 3B. Referring now to FIGS. 1 and 3B, the synchronization application 308 on the client 104 initiates synchronization (step 303) by establishing, for example, an HTTP connection with the server 102. A variety of conditions can cause the synchronization application 308 on the client 104 to initiate synchronization. For instance, the synchronization application 308 on the client 104 can initiate synchronization when it receives a new message notification from the server 102. The synchronization application 308 on the client 104 can also initiate synchronization when a message on the client 104 is deleted.

In one implementation, an unique ID is generated at each synchronization and saved on both the client 104 and the server 102. Prior to initiating the next synchronization, the client 104 transfers this unique ID to the server 102. The synchronization application 308 on the client 104 can proceed to synchronize the message on the client 104 and the server 102 after the server 102 compares and determines that the unique ID received from the client 104 and that saved on the server 102 corresponds. If the unique ID received from the client 104 and that is saved on the server 102 do not correspond, synchronization application 308 does not initiate a synchronization so as to avoid any unnecessary synchronization.

Other conditions that cause the synchronization application 308 on the client 104 to initiate synchronization can include, but are not limited to, the user 110 requesting synchronization, the client 104 connecting to the server 102, the state of the client 104 changing from offline to online, or a message on the client 104 changing status, a timer associated. Also, synchronization can be performed at predetermined intervals and initiated, for instance, by a synchronization timer.

Once synchronization is initiated (step 303), the synchronization application 308 on the client 104 sends a request to the server 102 through the server interaction module 306 to receive the state of the messages stored on the server 102 (step 305). The server 102 processes the request according to the steps outlined in reference to FIG. 2B and can send a response containing information about the state of the messages stored on the server 102 to the client 104.

Once the client 104 receives the state of the messages stored on the server 102 (step 307), the synchronization application 308 identifies the state of the messages stored on the client 104 (step 309) using the client message access module 304.

Subsequently, the client's synchronization application 308 assesses the discrepancies between the state of messages stored on the server 102 and the state of messages stored on the client 104 (step 311). In one implementation the discrepancy assessment involves comparing the indexes of the messages stored on the server 102 with the indexes of the messages stored on the client 104. For example, if the indexes of the messages on the server 102 are 1001, 1002, 1003 and 1004, and the indexes of the messages on the client 104 are 1001, 1002, and 1004, the message with index 1003 has been deleted from the client 104 but not from the server 102. The discrepancy assessment can further include comparing the statuses of the messages with the same indexes on the client 104 and on the server 102.

Based on the results of the discrepancy assessment (step 311) the synchronization application 308 creates a list of synchronization actions that need to be performed in order to synchronize the messages on the server 102 with the messages on the client 104 (step 313). The synchronization actions can include, but are not limited to, deleting messages on the client 104, changing the status of a given message of the client 104, sending a request to the server 102 to delete messages on the server 102, sending a request to the server 102 to change the status of a given message on the server 102. In one implementation, a list of synchronization actions is created based on the following rules:

1) If a new message has been added on the server 102 since the last synchronization (e.g., a new message has been received), the message is added on the client 104.

2) If a new message has been added on the client 104 since the last synchronization (e.g., a new message has been sent), the message is added on the server 102.

3) If a message on the server 102 has been marked as "read" since the last synchronization, the corresponding message on the client 104 is also marked as "read".

4) If a message on the client 104 has been marked as "read" since the last synchronization, the corresponding message on the server 102 is also marked as "read".

5) If a message on the server 102 has been marked as "unread" since the last synchronization, the corresponding message on the client 104 is also marked as "unread".

6) If a message on the client 104 has been marked as "unread" since the last synchronization, the corresponding message on the server 102 is also marked as "unread".

7) If a message on the server 102 has been deleted since the last synchronization, and the deletion was not performed by the autodelete module 200, the corresponding message on the client 104 is also deleted.

8) If a message on the client 104 has been deleted since the last synchronization, the corresponding message on the server 102 is also deleted.

Once the list of synchronization actions is created, the synchronization application 308 performs the synchronization actions in the list (step 315). Performing synchronization actions in the list can include, but is not limited to, updating the state of messages on the client 104 and sending requests to the server 102 to update the state of messages on the server 102.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN"), e.g., a wireless LAN, and a wide area network ("WAN"), e.g., the Internet.

The invention has been described in terms of particular embodiments, but other embodiments can be implemented and are within the scope of the following claims. For example, the operations of the invention can be performed in a different order and still achieve desirable results. As one example, the process depicted in FIG. 3B does not require the particular order shown, or sequential order, to achieve desirable results (e.g., step 305 can follow steps 307 and 309). Furthermore, synchronization application 308 can run on the client 104, or on the server 102. Moreover, a portion of the synchronization application 308 can run on the client 104, and a portion of the synchronization application 308 can run on the server 102. In certain implementations, multitasking and parallel processing may be preferable.

What is claimed is:

1. A method comprising:
storing, in a server message storage module associated with a user of a unified messaging system, a plurality of server messages on a server of the unified messaging system, the plurality of server messages including at least one voicemail or at least one fax;
storing a plurality of client messages in a client message storage module on a client device of the user, the plurality of client messages including at least one voicemail or at least one fax corresponding to the at least one voicemail or the at least one fax of the plurality of server messages; and
synchronizing the client message storage module with the server message storage module;
wherein synchronizing the client message storage module with the server message storage module includes a synchronization application installed on the client device of the user when executed by the client device performing the steps of:
sending a network request to a server of the unified messaging system;
receiving a network response to the network request from a server of the unified messaging system, the network response comprising state information about the plurality of server messages in the server message storage module;
identifying state information about the plurality of client messages in the client message storage module;
performing a discrepancy assessment between the state information about the plurality of server messages and the state information about the plurality of client messages;
creating a list of one or more synchronization actions based on results of the discrepancy assessment; and
performing the synchronization actions in the list.

2. The method of claim 1, wherein the state information about the plurality of server messages comprises, for each server message of the plurality of server messages, a message index of the server message and a message status of the server message.

3. The method of claim 2, wherein the message status is a read/unread status of the server message.

4. The method of claim 1, wherein the state information about the plurality of client messages comprises, for each client message of the plurality of client messages, a message index of the client message and a message status of the client message.

5. The method of claim 4, wherein the message status is a read/unread status of the client message.

6. The method of claim 1, wherein:
the state information about the plurality of server messages comprises, for each server message of the plurality of server messages, a message index of the server message;
the state information about the plurality of client messages comprises, for each client message of the plurality of client messages, a message index of the client message; and
performing the discrepancy assessment comprises:
performing a comparison between the message indices of the plurality of server messages and the message indices of the plurality of client messages;
determining, based on the comparison, whether any new client messages have been added to the client message storage module since a last synchronization between the client message storage module and the server message storage module; and
determining, based on the comparison, whether any new server messages have been added to the server message storage module since the last synchronization.

7. The method of claim 1, wherein:
the state information about the plurality of server messages comprises, for each server message of the plurality of server messages, a message status of the server message;
the state information about the plurality of client messages comprises, for each client message of the plurality of client messages, a message status of the client message; and
performing the discrepancy assessment comprises:
determining, based on the state information about the plurality of server messages, which server messages of the plurality of server messages, if any, have had a message status change in the server message storage module since a last synchronization between the client message storage module and the server message storage module; and
determining, based on the state information about the plurality of client messages, which client messages of the plurality of client messages, if any, have had a message status change in the client message storage module since the last synchronization.

8. The method of claim 1, wherein:
a particular server message of the plurality of server messages corresponds to a particular client message of the plurality of client messages;
performing the discrepancy assessment comprises determining that the particular server message of the plurality of server messages has been marked as read in the server message storage module since a last synchronization between the client message storage module and the server message storage module;
creating the list of synchronization actions comprises creating an action to mark a read/unread status of the particular client message in the client message storage module as read; and
performing the synchronization actions in the list comprises marking the read/unread status of the particular client message in the client message storage module as read.

9. The method of claim 1, wherein:
a particular server message of the plurality of server messages corresponds to a particular client message of the plurality of client messages;
performing the discrepancy assessment comprises determining that the particular client message of the plurality of client messages has been marked as read in the client message storage module since a last synchronization between the client message storage module and the server message storage module;
creating the list of synchronization actions comprises creating an action to send a network request to a server of the unified message system to mark a read/unread status of the particular server message in the server message storage module as read; and performing the synchronization actions in the list comprises sending the network request to the server of the unified message system to mark the read/unread status of the particular server message in the server message storage module as read.

10. The method of claim 1, wherein:

performing the discrepancy assessment comprises determining that a new server message has been added to the server message storage module since a last synchronization between the client message storage module and the server message storage module;

creating the list of synchronization actions comprises creating an action to download the new server message from a server of the unified messaging system; and performing the synchronization actions in the list comprises downloading the new server message from a server of the unified messaging system.

11. The method of claim 1, wherein:

performing the discrepancy assessment comprises determining that a new client message has been added to the client message storage module since a last synchronization between the client message storage module and the server message storage module;

creating the list of synchronization actions comprises creating an action to upload the new client message to a server of the unified messaging system; and performing the synchronization actions in the list comprises uploading the new client message to a server of the unified messaging system.

12. The method of claim 1, wherein:

performing the discrepancy assessment comprises determining that a client message has been deleted from the client message storage module since a last synchronization between the client message storage module and the server message storage module;

wherein the deleted client message corresponds to a particular server message of the plurality of server messages;

creating the list of synchronization actions comprises creating an action to send a network request to a server of the unified messaging system to delete the particular server message from the server message storage module; and performing the synchronization actions in the list comprises sending the network request to a server of the unified messaging system to delete the particular server message from the server message storage module.

13. The method of claim 1, wherein the synchronization application is not an e-mail application.

14. The method of claim 1, wherein the client device is phone, a fax machine, or a personal computer.

15. The method of claim 1, wherein:

performing the discrepancy assessment comprises determining that a new server message has been added to the server message storage module since a last synchronization between the client message storage module and the server message storage module, and determining that a new client message has been added to the client message storage module since the last synchronization;

creating the list of synchronization actions comprises creating an action to download the new server message from a server of the unified messaging system, and creating an action to upload the new client message to a server of the unified messaging system; and performing the synchronization actions in the list comprises downloading the new server message from a server of the unified messaging system, and uploading the new client message to a server of the unified messaging system.

16. A unified messaging system comprising:

a server having at least one processor and memory, the server capable of operatively coupling to a data network;

a server message storage module configured to store a plurality of server messages, the plurality of server messages including at least one voicemail or at least one fax;

a client message storage module configured to store a plurality of client messages, the plurality of client messages including at least one voicemail or at least one fax corresponding to the at least one voicemail or the at least one fax of the plurality of server messages; and a synchronization application configured to:
 send a network request to the server over the data network;
 receive a network response to the network request from the server over the data network, the network response comprising state information about the plurality of server messages in the server message storage module;
 identify state information about the plurality of client messages in the client message storage module;
 perform a discrepancy assessment between the state information about the plurality of server messages and the state information about the plurality of client messages;
 create a list of one or more synchronization actions based on results of the discrepancy assessment; and
 perform the synchronization actions in the list.

17. The system of claim 16, wherein the state information about the plurality of server messages comprises, for each server message of the plurality of server messages, a message index of the server message and a message status of the server message.

18. The system of claim 17, wherein the message status is a read/unread status of the server message.

19. The system of claim 16, wherein the state information about the plurality of client messages comprises, for each client message of the plurality of client messages, a message index of the client message and a message status of the client message.

20. The system of claim 19, wherein the message status is a read/unread status of the client message.

21. The system of claim 16, wherein:

the state information about the plurality of server messages comprises, for each server message of the plurality of server messages, a message index of the server message;

the state information about the plurality of client messages comprises, for each client message of the plurality of client messages, a message index of the client message; and the synchronization application is further configured to:
 perform a comparison between the message indices of the plurality of server messages and the message indices of the plurality of client messages;
 determine, based on the comparison, whether any new client messages have been added to the client message storage module since a last synchronization between the client message storage module and the server message storage module; and
 determine, based on the comparison, whether any new server messages have been added to the server message storage module since the last synchronization.

22. The system of claim 16, wherein:
the state information about the plurality of server messages comprises, for each server message of the plurality of server messages, a message status of the server message;
the state information about the plurality of client messages comprises, for each client message of the plurality of client messages, a message status of the client message; and
the synchronization application is further configured to:
   determine, based on the state information about the plurality of server messages, which server messages of the plurality of server messages, if any, have had a message status change in the server message storage module since a last synchronization between the client message storage module and the server message storage module; and
   determine, based on the state information about the plurality of client messages, which client messages of the plurality of client messages, if any, have had a message status change in the client message storage module since the last synchronization.

23. The system of claim 16, wherein:
a particular server message of the plurality of server messages corresponds to a particular client message of the plurality of client messages; and
the synchronization application is further configured to:
   determine that the particular server message of the plurality of server messages has been marked as read in the server message storage module since a last synchronization between the client message storage module and the server message storage module; and
   mark a read/unread status of the particular client message in the client message storage module as read.

24. The system of claim 16, wherein:
a particular server message of the plurality of server messages corresponds to a particular client message of the plurality of client messages;
the synchronization application is further configured to:
   determine that the particular client message of the plurality of client messages has been marked as read in the client message storage module since a last synchronization between the client message storage module and the server message storage module; and
   send a network request over the data network to the server to mark a read/unread status of the particular server message in the server message storage module as read.

25. The system of claim 16, wherein the synchronization application is further configured to:
   determine that a new server message has been added to the server message storage module since a last synchronization between the client message storage module and the server message storage module; and
   download the new server message over the data network from the server.

26. The system of claim 16, wherein the synchronization application is further configured to:
   determine that a new client message has been added to the client message storage module since a last synchronization between the client message storage module and the server message storage module; and
   upload the new client message over the data network to the server.

27. The system of claim 16, wherein the synchronization application is further configured to:
   determine that a client message has been deleted from the client message storage module since a last synchronization between the client message storage module and the server message storage module, the deleted client message corresponding to a particular server message of the plurality of server messages; and
   send a network request over the data network to the server to delete the particular server message from the server message storage module.

28. The system of claim 16, wherein the synchronization application is not an e-mail application.

29. The system of claim 16, wherein the synchronization application is installed on a phone, a fax machine, or a personal computer.

30. The system of claim 16, wherein the synchronization application is further configured to:
   determine that a new server message has been added to the server message storage module since a last synchronization between the client message storage module and the server message storage module;
   determine that a new client message has been added to the client message storage module since the last synchronization;
   download the new server message over the data network from the server; and
   uploading the new client message over the data network to the server.

* * * * *